United States Patent
Ioffe

(10) Patent No.: US 10,671,922 B2
(45) Date of Patent: Jun. 2, 2020

(54) BATCH RENORMALIZATION LAYERS

(71) Applicant: Google LLC, Mountain View, CA (US)

(72) Inventor: Sergey Ioffe, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/459,057

(22) Filed: Jul. 1, 2019

(65) Prior Publication Data

US 2019/0325315 A1  Oct. 24, 2019

Related U.S. Application Data

(63) Continuation of application No. PCT/US2018/017597, filed on Feb. 9, 2018.

(60) Provisional application No. 62/457,649, filed on Feb. 10, 2017.

(51) Int. Cl.
| | |
|---|---|
| *G06F 15/18* | (2006.01) |
| *G06N 3/08* | (2006.01) |
| *G06N 20/00* | (2019.01) |
| *G06F 17/18* | (2006.01) |
| *G06K 9/62* | (2006.01) |
| *G06N 3/04* | (2006.01) |

(52) U.S. Cl.
CPC ............ *G06N 3/084* (2013.01); *G06F 17/18* (2013.01); *G06K 9/6298* (2013.01); *G06N 3/0481* (2013.01); *G06N 20/00* (2019.01)

(58) Field of Classification Search
CPC .. G06F 3/0481; G06F 11/0709; G06F 11/079; G06F 11/0793; G06F 16/244; G06F 16/285; G01N 2500/04; G01N 33/57423; G01N 33/6848; G01N 33/6893; G06N 20/00; G06N 7/005
See application file for complete search history.

(56) References Cited

U.S. PATENT DOCUMENTS

| | | | | |
|---|---|---|---|---|
| 5,479,576 A | * | 12/1995 | Watanabe ................ | G06N 3/08 706/25 |
| 10,417,562 B2 | * | 9/2019 | Ioffe ..................... | G06N 3/08 |

OTHER PUBLICATIONS

Arpit et al, "Normalization propagation: a parametric technique for removing internal covariate shift in deep networks," arXiv, Jul. 12, 2016.
Ba et al, "Layer normalization," arXiv, Jul. 21, 2016, 14 pages.
Chen et al, "Revisiting distributed synchronous sgd" arXiv, Apr. 2016, 5 pages.

(Continued)

*Primary Examiner* — Luis A Sitiriche
(74) *Attorney, Agent, or Firm* — Fish & Richardson P.C.

(57) ABSTRACT

Methods, systems, and apparatus, including computer programs encoded on a computer storage medium, for implementing a neural network. In one aspect, the neural network includes a batch renormalization layer between a first neural network layer and a second neural network layer. The first neural network layer generates first layer outputs having multiple components. The batch renormalization layer is configured to, during training of the neural network on a current batch of training examples, obtain respective current moving normalization statistics for each of the multiple components and determine respective affine transform parameters for each of the multiple components from the current moving normalization statistics. The batch renormalization layer receives a respective first layer output for each training example in the current batch and applies the affine transform to each component of a normalized layer output to generate a renormalized layer output for the training example.

26 Claims, 3 Drawing Sheets

(56) References Cited

OTHER PUBLICATIONS

Goldberger et al, "Neighborhood components analysis" In Advances in Neural Information Processing Systems 2014, 8 pages.
He et al, "Deep residual learning for image recognition" IEEE Conference on Computer Vision and Patter Recognition, 9 pages.
Ioffe et al, "Batch normalization: Accelerating deep network training by reducing internal covariate shift" arXiv, Mar. 2015, 11 pages.
Liao et al, "Streaming normalization: towards simpler and more biologically-plausible normalizations for online and recurrent learning," arXIv, Oct. 19, 2016, 21 pages.
Nair et al, "Rectified linear units improve restricted boltzmann machines" ICML, 2010, 8 pages.
PCT International Search Report and Written Opinion in International Appln. PCT/US2018/017597, dated May 16, 2018, 15 pages.
Ren et al, "Normalizing the normalizers: comparing and extending network normalization scheme," arXiv, Mar. 6, 2017, 16 pages.
Russakovsky et al, "ImageNet Large Scale Visual Recognition Challenge" arXiv, Dec. 2014, 37 pages.
Salimans et al, "Improved techniques for training GANs," arXiv, Jun. 10, 2016, 10 pages.
Salimans et al, "Weight normalization: a simple reparameterization to accelerate training of deep neural networks," arXiv, Jun. 4, 2016, 11 pages.
Schroff et al, "Facenet: A unified embedding for face recognition and clustering" arXiv, Jun. 2015, 10 pages.
Szegedy et al, "Rethinking the inception architecture for computer vision" Proceedings of the IEEE Conference on Computer Vision and Pattern Recognition, 2016, 9 pages.
Tieleman et al [online], "Lecture 10.5—Dropout Neural Networks for Machine Learning" Lecture from the course Neural Networks for Machine Learning on Coursera, 2012, retrieved on Jul. 26, 2019, <https://www.youtube.com/watch?v=vAVOY8frL1Q>, 1 page [Video Submission].
Ulyanov et al, "Instance normalization: the missing ingredient for fast stylization," arXiv, Nov. 6, 2017, 6 pages.
PCT International Preliminary Report on Patentability issued in International Application No. PCT/US2018/017597, dated Aug. 22, 2019, 9 pages.

* cited by examiner

BATCH RENORMALIZATION LAYERS

CROSS-REFERNCE TO RELATED APPLICATION

This application is a continuation of International Application No. PCT/US2018/017597, filed Feb. 9, 2018, which claims the benefit under 35 U.S.C. 119 of Provisional Application ser. No. 62/457,649, filed Feb. 10, 2017, both of which are incorporated by refernce.

BACKGROUND

This specification relates to processing inputs through the layers of neural networks to generate outputs.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a neural network system implemented as computer programs on one or more computers in one or more locations that includes one or more batch renormalization layers.

According to a first aspect there is provided a system comprising one or more computers and one or more storage devices storing instructions that when executed by one or more computers cause the one or more computers to implement a neural network, the neural network comprising: a batch renormalization layer between a first neural network layer and a second neural network layer, wherein the first neural network layer generates first layer outputs having a plurality of components, and wherein the batch renormalization layer is configured to, during training of the neural network on a current batch of training examples: obtain respective current moving normalization statistics for each of the plurality of components that are based on previous first layer outputs generated by the first neural network layer during training of the neural network on previous batches of training examples; receive a respective first layer output for each training example in the current batch; compute respective current batch normalization statistics for each of the plurality of components from the first layer outputs for the training examples in the current batch; determine respective affine transform parameters for an affine transform for each of the plurality of components from the current moving normalization statistics and the current batch normalization statistics; and for each of the first layer outputs for each of the training examples in the current batch: normalize each component of the first layer output using the current batch normalization statistics for the component to generate a normalized layer output for the training example, apply the affine transform to each component of the normalized layer output in accordance with the affine transform parameters for the component to generate a renormalized layer output for the training example, generate a batch renormalization layer output for the training example from the renormalized layer output, and provide the batch renormalization layer output as an input to the second neural network layer.

In some implementations, the batch renormalization layer is further configured to: update the current moving normalization statistics for each component using the current batch normalization statistics for the component to generate updated moving normalization statistics for the component.

In some implementations, during the training of the neural network, the system is configured to backpropagate through the current batch normalization statistics as part of adjusting values of parameters of the neural network while treating the moving normalization statistics and the parameters of the affine transform as a constant.

In some implementations, the plurality of components are respective dimensions of the first layer outputs.

In some implementations, the first neural network layer is a convolutional layer, wherein the first layer outputs comprise a plurality of feature maps, and wherein each component is a respective feature map.

In some implementations, the current moving normalization statistics comprise, for each of the components: a moving mean of the component for the previous first layer outputs, and a moving approximated standard deviation for the component of the first layer outputs; wherein computing a plurality of current batch normalization statistics for the first layer outputs comprises, for each of the components: computing a mean of the component for the first layer outputs in the current batch; and computing an approximated standard deviation for the component of the first layer outputs in the current batch.

In some implementations, normalizing each component of each first layer output comprises: normalizing the component of the first layer output using the computed mean and computed approximate standard deviation for the component.

In some implementations, determining respective parameters for an affine transform for each of the components comprises, for each component: determining a first parameter for the component from a ratio between (i) a difference between the mean for the component and the moving mean for the component and (ii) the moving approximated standard deviation for the component; and determining a second parameter for the component from a ratio between the approximated standard deviation for the component and the moving approximated standard deviation for the component.

In some implementations, applying the affine transform to each component of the normalized layer output in accordance with the parameters comprises: multiplying the component of the normalized layer output by the second parameter for the component to generate a product; and adding the first transform for the component to the product to generate the component of the renormalized layer output.

In some implementations, values of the first parameter and the second parameter are constrained to fall in a pre-determined range.

In some implementations, an approximate standard deviation for a component is a square root of a sum of a variance for the component and a pre-determined constant value.

In some implementations, generating the respective batch renormalization layer output for the training example from the renormalized layer outputs comprises: transforming, for each component, the component of the renormalized layer output for the training example in accordance with current values of a set of learnable parameters for the component.

In some implementations, the batch renormalization layer is configured to, after the neural network has been trained to determine trained values of the learnable parameters for each of the components: receive a new first layer output generated by the first neural network layer for a new neural network input; normalize each component of the new first layer output using respective pre-computed normalization statistics for the component to generate a new renormalized layer output; generate a new batch renormalization layer output by transforming, for each component, the component of the new renormalized layer output in accordance with the trained values of the set of learnable parameters for the component; and provide the batch renormalization layer output as a new layer input to the second neural network layer.

In some implementations, the pre-computed normalization statistics for the components are final moving normalization statistics after training of the neural network.

In some implementations, the pre-computed normalization statistics for the components are computed from new first layer outputs generated by the first neural network layer after the neural network has been trained.

In some implementations, the affine transform parameters include a scale parameter and a bias parameter, and wherein determining respective affine transform parameters comprises: determining the scale parameter value to be one and the bias parameter value to be zero if a number of completed training iterations is less than a predetermined threshold number of training iterations.

In some implementations, generating a renormalized layer output for the training example further comprises: clipping each component of the renormalized layer output to cause the component to lie in a predetermined range.

In some implementations, new neural network inputs processed by the neural network after the neural network has been trained are a different type of input than the training examples used to train the neural network.

In some implementations, the first neural network layer generates the first layer outputs by modifying first layer inputs in accordance with current values of a set of parameters for the first neural network layer.

In some implementations, the second neural network layer generates second layer outputs by applying a non-linear activation function to the batch renormalization layer outputs.

In some implementations, the first neural network layer generates the first layer outputs by modifying first layer inputs in accordance with current values of a set of parameters to generate modified first layer inputs and then applying a non-linear activation function to the modified first layer inputs.

In some implementations, the neural network is a feed-forward neural network.

In some implementations, the neural network is a recurrent neural network.

According to a second aspect, there is provided a system comprising one or more computers and one or more storage devices storing instructions that when executed by one or more computers cause the one or more computers to implement: a neural network, wherein the neural network is configured to receive neural network inputs and to process the neural networks to generate a respective neural network output for each of the neural network inputs, and wherein the neural network comprises the previously described batch renormalization layer.

According to a third aspect, there is provided a method comprising the operations performed by the previously described batch renormalization layer.

According to a fourth aspect, there is provided one or more computer-storage media storing instructions that when executed by the one or more computers cause the one or more computers to implement the previously described neural network.

According to a fifth aspect, there is provided one or more computer-storage media storing instructions that when executed by the one or more computers cause the one or more computers to perform the operations performed by the previously described batch renormalization layer.

Particular embodiments of the subject matter described in this specification can be implemented so as to realize one or more of the following advantages.

A neural network system as described in this specification includes batch renormalization layers that, during training, generate batch renormalization layer outputs which include a correction factor to adjust for differences between the normalization statistics for the batch of training examples currently being processed and the normalization statistics for the set of training data as a whole. Thus the batch renormalization layers as described in this specification remove the dependence of the batch renormalization layer output on the characteristics of the batch currently being processed, causing the batch renormalization layer outputs generated during training to be well-matched to the batch renormalization layer outputs generated once the neural network is trained.

In contrast, some conventional neural network systems include conventional batch normalization layers. During training, conventional batch normalization layers generate batch normalization layer outputs that directly depend on the normalization statistics of the batch of training examples currently being processed, thereby causing a mismatch between the batch normalization layer outputs generated during training and the batch normalization layer outputs generated once the neural network is trained. Other conventional neural network systems do not perform any normalization between network layers, thereby causing the distribution of each layer's inputs to change during training as the parameters of the previous layer change (i.e., the phenomenon sometimes referred to as internal covariate shift), and consequently reducing the effectiveness of the training.

Therefore, by including batch renormalization layers, the neural network system as described in this specification has superior performance (e.g., prediction accuracy) after training, is less sensitive to training initialization (e.g., how the parameters of the neural network are initialized before training), and can be trained more quickly (i.e., over fewer training iterations) than conventional neural network systems.

For example, by causing the batch renormalization layer outputs generated during training to be well-matched to the batch renormalization layer outputs generated once the neural network is trained, the batch renormalization layer generates similar outputs during training and after training. Thus, adjustments made to the parameters of the neural network system during training to improve the performance of the neural network system result in improvements to the performance of the neural network system after training as well, which would not necessarily be the case if the batch renormalization layer generated different outputs after training than during training (as do, e.g., conventional batch normalization layers).

Moreover, since the neural network system as described in this specification can be trained more quickly than conventional neural network systems, it consumes fewer computational resources (e.g., memory and computing power) during training.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
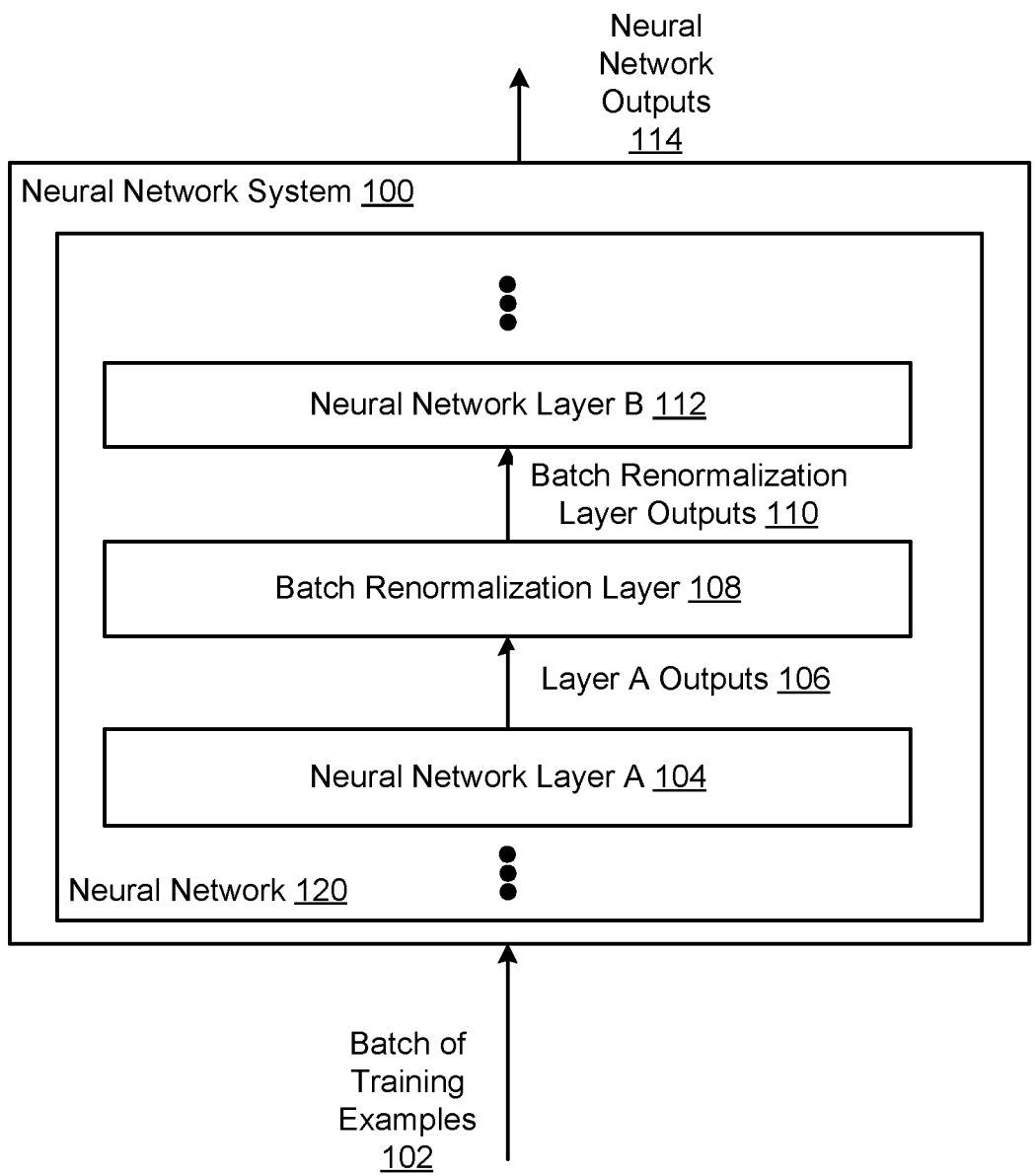
FIG. 1 shows an example neural network system.

FIG. 1 shows an example neural network system 100. The neural network system 100 is an example of a system implemented as computer programs on one or more computers in one or more locations, in which the systems, components, and techniques described below can be implemented.

The neural network system 100 includes a neural network 120 that, in turn, includes multiple neural network layers. The neural network 120 generates neural network outputs from neural network inputs by processing the neural network inputs through each of the layers. The neural network 120 can be a feed-forward neural network (e.g., a multi-layer perception or a convolutional neural network), a recurrent neural network (e.g., a long short-term memory network), or any other kind of neural network.

The neural network 120 can be configured to receive any kind of digital data input and to generate any kind of score or classification output based on the input.

For example, if the inputs to the neural network 120 are images or features that have been extracted from images, the output generated by the neural network 120 for a given image may be scores for each of a set of object categories, with each score representing an estimated likelihood that the image contains an image of an object belonging to the category.

As another example, if the inputs to the neural network 120 are Internet resources (e.g., web pages), documents, or portions of documents or features extracted from Internet resources, documents, or portions of documents, the output generated by the neural network 120 for a given Internet resource, document, or portion of a document may be a score for each of a set of topics, with each score representing an estimated likelihood that the Internet resource, document, or document portion is about the topic.

As another example, if the inputs to the neural network 120 are features of an impression context for a particular advertisement, the output generated by the neural network 120 may be a score that represents an estimated likelihood that the particular advertisement will be clicked on.

As another example, if the inputs to the neural network 120 are features of a personalized recommendation for a user, e.g., features characterizing the context for the recommendation, e.g., features characterizing previous actions taken by the user, the output generated by the neural network 120 may be a score for each of a set of content items, with each score representing an estimated likelihood that the user will respond favorably to the content item being recommended to them.

As another example, if the input to the neural network 120 is text in one language, the output generated by the neural network 120 may be a score for each of a set of pieces of text in another language, with each score representing an estimated likelihood that the piece of text in the other language is a proper translation of the input text into the other language.

As another example, if the input to the neural network 120 is a spoken utterance, a sequence of spoken utterances, or features derived from one of the two, the output generated by the neural network 120 may be a score for each of a set of pieces of text, each score representing an estimated likelihood that the piece of text is the correct transcript for the utterance or sequence of utterances.

As another example, the neural network 120 can be part of an autocompletion system or part of a text processing system.

As another example, the neural network 120 can be part of a reinforcement learning system and can generate outputs used for selecting actions to be performed by an agent interacting with an environment.

In particular, each of the layers of the neural network 120 is configured to receive an input and generate an output from the input. The neural network layers collectively process neural network inputs received by the neural network 120 to generate a respective neural network output for each received neural network input. Some or all of the neural network layers generate outputs from inputs in accordance with current values of a set of parameters for the neural network layer. For example, some layers may multiply the received input by a matrix of current parameter values as part of generating an output from the received input.

The neural network 120 also includes a batch renormalization layer 108 between a neural network layer A 104 and a neural network layer B 112. The batch renormalization layer 108 is configured to perform one set of operations after receiving inputs from the neural network layer A 104 during training of the neural network 120 and another set of operations after receiving inputs from the neural network layer A 104 after the neural network 120 has been trained.

In particular, the neural network 120 can be trained on multiple batches of training examples in order to determine trained values of the parameters of the neural network layers. A batch of training examples is a set of multiple training examples. For example, during training, the neural network 120 can process a batch of training examples 102 and generate a respective neural network output for each training example in the batch 102. The neural network outputs can then be used to adjust the values of the parameters of the neural network layers, e.g., through conventional gradient descent and backpropagation neural network training techniques.

During training of the neural network 120 on a given batch of training examples, the batch renormalization layer 108 is configured to receive layer A outputs 106 generated by the neural network layer A 104 for the training examples in the batch, process the layer A outputs 106 to generate a respective batch renormalization layer output 110 for each training example in the batch, and then provide the batch renormalization layer outputs 110 as an input to the neural network layer B 112. The layer A outputs 106 include a respective output generated by the neural network layer A 104 for each training example in the batch. Similarly, the batch renormalization layer outputs 110 include a respective output generated by the batch renormalization layer 108 for each training example in the batch.

Generally, during training, the batch renormalization layer 108: (i) normalizes the layer A outputs 106 using normalization statistics for the current batch to generate a respective normalized output for each training example in the current batch, (ii) renormalizes the normalized outputs using affine transformations (i.e., transformations parametrized by a scale parameter and a bias parameter) to generate a respective renormalized output for each training example in the current batch, and, optionally, (iii) transforms each of the renormalized outputs before providing the outputs as input to the neural network layer B 112.

The affine transformations that are applied by the batch renormalization layer 108 to the normalized outputs to generate the renormalized outputs correct for differences between the normalization statistics for the current batch and the normalization statistics for the set of training data as a whole. Thus, the affine transformations remove the dependence of the batch renormalization layer output on the characteristics of the current batch.

As will be described in more detail below, once the neural network 120 is trained, the batch renormalization layer 108 generates the batch renormalization layer outputs 110 by normalizing the layer A outputs 106 based on pre-computed normalization statistics that similarly do not depend on the normalization statistics of any particular batch of training data. Therefore, by applying the affine transformations to generate renormalized outputs, the neural network 120 causes the batch renormalization layer outputs 110 generated by the batch renormalization layer 108 during training to be well-matched to the batch renormalization layer outputs 110 generated once the neural network 120 is trained, and thereby, for example, improve the performance of the neural network 120 after training. In particular, since the batch renormalization layer outputs 110 generated by the batch renormalization layer 108 during training are well-matched to the batch renormalization layer outputs 110 generated once the neural network 120 is trained, the neural network 120 generates similar outputs during training and after training. Thus, adjustments made to the parameters of the neural network 120 during training to improve the performance of the neural network 120 result in improvements to the performance of the neural network 120 after training as well, which would not necessarily be the case if the batch renormalization layer 108 generated different outputs after training than during training (as with, e.g., conventional batch normalization layers).

The system 100 trains the neural network 120 by computing the gradient of a loss function with respect to selected parameters of the neural network 120, and backpropagating the gradient through the neural network 120 to adjust the values of the selected parameters. In particular, the system 100 is configured to train the neural network 120 by backpropagating through the normalization statistics for the current batch while treating the parameters of the affine transformations of the batch renormalization layer 108 as constants. Backpropagating through the normalization statistics for the batch refers to performing gradient descent by computing the gradient of a loss function with respect to parameters of the neural network 120 including the normalization statistics. Treating the parameters of the affine transformations as constants refers to excluding them from the gradient computation.

The normalization statistics and the parameters of the affine transformations computed by the batch renormalization layer 108 and the manner in which the batch renormalization layer 108 normalizes and renormalizes the layer A outputs 106 during training depend on the nature of the neural network layer A 104 that generates the layer A outputs 106.

In some cases, the neural network layer A 104 is a layer that generates an output that includes multiple components indexed by a single dimension. For example, the neural network layer A 104 may be a fully-connected neural network layer.

In some other cases, however, the neural network layer A 104 is a convolutional layer or other kind of neural network layer that generates an output that includes multiple components that are each indexed by both a feature index and a spatial location index. Generating the batch renormalization layer output during training of the neural network 120 in each of these two cases is described in more detail with reference to FIG. 2.

Once the neural network 120 has been trained (i.e., by the system 100), the neural network 120 may receive a new neural network input for processing and process the neural network input through the neural network layers to generate a new neural network output for the input in accordance with the trained values of the parameters of the neural network 120. The operations performed by the batch renormalization layer 108 during the processing of the new neural network input also depend on the nature of the neural network layer A 104. Processing a new neural network input after the neural network 100 has been trained is described in more detail with reference to FIG. 3.

The batch renormalization layer 108 may be included at various locations in the neural network (i.e., between any appropriate neural network layers) and, in some implementations, multiple batch renormalization layers may be included in the neural network.

In the example of FIG. 1, in some implementations, the neural network layer A 104 generates outputs by modifying inputs to the layer in accordance with current values of a set of parameters for the first neural network layer, e.g., by multiplying the input to the layer by a matrix of the current parameter values. In these implementations, the neural network layer B 112 may receive an output from the batch renormalization layer 108 and generate an output by applying a non-linear operation, i.e., a non-linear activation function, to the batch renormalization layer output 110. Thus, in these implementations, the batch renormalization layer 108 is inserted within a conventional neural network layer, and the operations of the conventional neural network layer are divided between the neural network layer A 104 and the neural network layer B 112.

In some other implementations, the neural network layer A 104 generates the outputs by modifying layer inputs in accordance with current values of a set of parameters to generate a modified first layer inputs and then applying a non-linear operation to the modified first layer inputs before providing the output to the batch renormalization layer 108. Thus, in these implementations, the batch renormalization layer 108 is inserted after a conventional neural network layer (i.e., receives inputs from the conventional neural network layer).

Figure 2:
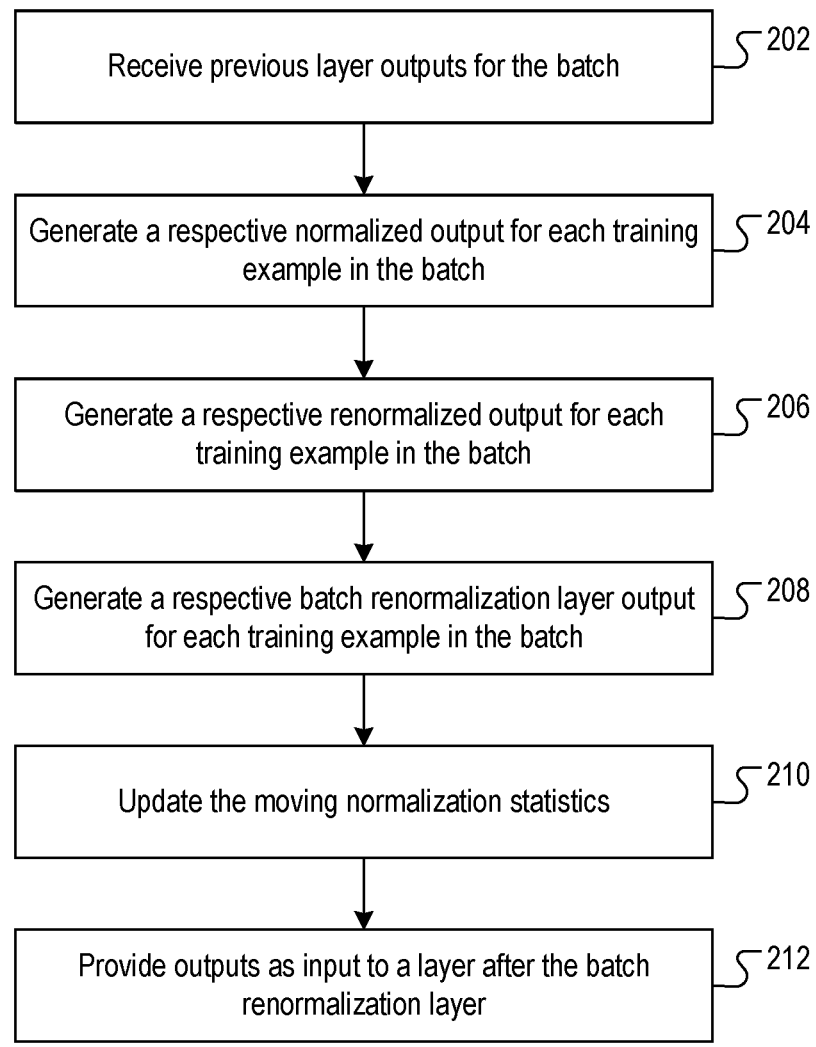
FIG. 2 is a flow diagram of an example process for processing previous layer outputs using a batch renormalization layer during training of the neural network.

FIG. 2 is a flow diagram of an example process for processing previous layer outputs using a batch renormalization layer during training of the neural network. For convenience, the process 200 will be described as being performed by a system of one or more computers located in one or more locations. For example, a batch renormalization layer included in a neural network system, e.g., the batch renormalization layer 108 included in the neural network system 100 of FIG. 1, appropriately programmed, can perform the process 200.

The batch renormalization layer receives previous layer outputs for the batch of training examples (step 202). The previous layer outputs include a respective output generated for each training example in the batch by the layer previous to the batch renormalization layer in the neural network (i.e., the layer that is configured to provide its output as input to the batch renormalization layer).

The batch renormalization layer generates a respective normalized output for each training example in the batch (step 204). That is, the batch renormalization layer generates a respective normalized output from each received previous layer output. Specifically, the system determines normalization statistics corresponding to each component of the previous layer outputs and generates respective normalized outputs from the received previous layer outputs by normalizing each component of each received previous layer output using the corresponding normalization statistics.

In some cases, the layer previous to the batch renormalization layer is a layer that generates an output that includes multiple components indexed by a single dimension (e.g., a fully connected layer). In these cases, the batch renormalization layer computes, for each dimension, normalization statistics including the mean and the standard deviation of the components of the previous layer outputs that correspond to the dimension. The normalization statistics corresponding to a component are given by the normalization statistics of the dimension corresponding to the component.

In some of these cases, the batch renormalization layer computes, for each dimension, normalization statistics including the mean and the standard deviation of the components of the lower layer outputs that correspond to the dimension. The batch renormalization layer then normalizes each component of each of the lower level outputs using the normalization statistics to generate a respective normalized output for each of the training examples in the batch. In particular, for a given component of a given previous layer output, the batch renormalization layer normalizes the component using the mean and the standard deviation computed for the dimension corresponding to the component. For example, in some implementations, for a component $x_{k,i}$ corresponding to the k-th dimension of the i-th lower layer output from a batch $\mathcal{B}$, the normalized output $\hat{x}_{k,i}$ satisfies:

$$\hat{x}_{k,i} = \frac{x_{k,i} - \mu_{\mathcal{B}}}{\sigma_{\mathcal{B}}},$$

where $\mu_{\mathcal{B}}$ is the mean of the components corresponding to the k-th dimension of the previous layer outputs in the batch $\mathcal{B}$ and $\sigma_{\mathcal{B}}$ is the standard deviation of the components corresponding to the k-th dimension of the lower layer outputs in the batch $\mathcal{B}$. In some implementations, the standard deviation is a numerically stable standard deviation that is equal to $(v_{\mathcal{B}}^2 + \epsilon)^{1/2}$, where $\epsilon$ is a constant value (e.g., a small positive constant) and $\sigma_{\mathcal{B}}^2$ is the variance of the components corresponding to the k-th dimension of the lower layer outputs in the batch $\mathcal{B}$.

In some other cases, the neural network layer previous to the batch renormalization layer is a neural network layer that generates an output that includes multiple components that are each indexed by both a feature index and a spatial location index (e.g., a convolutional layer). In these cases, the batch renormalization layer computes, for each feature index, normalization statistics including the mean and the standard deviation of the components of the lower layer outputs that correspond to the feature index. The normalization statistics corresponding to a component are given by the normalization statistics of the feature index corresponding to the component.

In some of these cases, the batch renormalization layer computes, for each possible feature index and spatial location index combination, the mean and the variance of the components of the previous layer outputs that have that feature index and spatial location index. The batch renormalization layer then computes normalization statistics for each feature index by computing the average of the means for the feature index and spatial location index combinations that include the feature index, and the average of the variances for the feature index and spatial location index combinations that include the feature index.

The batch renormalization layer then normalizes each component of each of the lower level outputs using the normalization statistics to generate a respective normalized output for each of the training examples in the batch. In particular, for a given component of a given output, the batch renormalization layer normalizes the component using the average mean and the average variance for the feature index corresponding to the component, e.g., in the same manner as described above when the layer previous to the batch renormalization layer generates outputs indexed by a single dimension.

In others of these cases, the batch renormalization layer computes normalization statistics for each feature index by computing the mean and the variance of the components of the previous layer outputs that correspond to the feature index, i.e., that have the feature index. The batch renormalization layer then normalizes each component of each of the previous layer outputs using the normalization statistics for the feature indices to generate a respective normalized output for each of the training examples in the batch. In particular, for a given component of a given output, the batch renormalization layer normalizes the component using the mean and the variance for the feature index corresponding to the component, e.g., in the same manner as described above when the layer previous to the batch renormalization layer generates outputs indexed by a single dimension.

The batch renormalization layer generates a respective renormalized output for each training example in the batch (step 206). Specifically, the batch renormalization layer determines an affine transformation for each component of the previous layer outputs. The batch renormalization layer generates a respective renormalized output for each previous layer output by transforming each component of the normalized output corresponding to the previous layer output by the affine transformation corresponding to the component.

The batch renormalization layer determines the parameters of the affine transformation for a component based on the normalization statistics for the component (i.e., as described with reference to 204) and moving normalization statistics for the component.

In particular, the batch renormalization layer maintains moving normalization statistics for each component. The moving normalization statistics for a component are moving averages of the normalization statistics for the component (specifically, the mean and standard deviation normalization statistics). The moving averages are computed with respect to the normalization statistics determined for the component for batches of training examples processed during previous training iterations. The batch renormalization layer updates the moving normalization statistics for each component at each training iteration, as described further with reference to 210.

The batch renormalization layer determines the scale parameter and the bias parameter of the affine transformation for a component as:

$$r = \frac{\sigma_B}{\sigma}, d = \frac{\mu_B - \mu}{\sigma},$$

where r is the scale parameter, d is the bias parameter, $\sigma_B$ is the standard deviation normalization statistic for the component for the current batch, $\sigma$ is the standard deviation moving normalization statistic for the component, $\mu_B$ is the mean normalization statistic for the component for the current batch, and $\mu$ is the mean moving normalization statistic for the component.

In some implementations, for a predetermined number of initial training iterations, the values of the scale parameter and bias parameter of the affine transformation for each component are fixed at values 1 and 0 respectively. When the values of the parameters of the affine transformation are fixed at these values, the operation of the batch renormalization layer is identical to that of a conventional batch normalization layer.

In some implementations, the values of the scale parameter and the bias parameter of the affine transformation for each component are restricted to lie in a predetermined range. For example, the value of the scale parameter for each component may be restricted to lie in a range of the form:

$$\left[\frac{1}{r_{max}}, r_{max}\right],$$

where $r_{max}$ is a positive value (e.g., chosen arbitrarily or by a cross-validation hyper-parameter selection process), and the value of the bias parameter for each component may be restricted to lie in a range of the form:

$$[-d_{max}, d_{max}],$$

where $d_{max}$ is a positive value. If the values of the parameters of the affine transformation are determined to lie outside the predetermined ranges, then the batch renormalization layer clips the parameter values to cause them to lie in the predetermined range. The predetermined ranges of allowable values for the affine transformation parameters may differ between training iterations. For example, the size of the predetermined range of allowable values for an affine transformation parameter may be gradually increased over a number of iterations until the size reaches a predetermined maximum.

The batch renormalization layer renormalizes each component of each of the normalized outputs using the affine transformations to generate a respective renormalized output for each of the training examples in the batch. In particular, for a given component of a given normalized output, the batch renormalization layer generates the corresponding component of the renormalized output using the affine transformation with the parameters determined for the component, for example, as:

$$\hat{y} = \hat{x} \cdot r + d,$$

where $\hat{y}$ is the component of the renormalized output, $\hat{x}$ is the component of the normalized output, r is the scale parameter of the affine transformation for the component, and d is the bias parameter of the affine transformation for the component.

Optionally, the batch renormalization layer clip each component of each renormalized output to lie in a fixed range, for example, the range [−c, +c], where c is a positive number. This clipping operation has the effect of removing outliers in the components of the renormalized outputs (i.e., components that are much larger or much smaller than the corresponding components from other training examples in the batch). In turn, this reduces the likelihood of large gradients being backpropagated through the system and destabilizing the training.

The batch renormalization layer generates a respective batch renormalization layer output for each training example in the batch (208).

In some implementations, the batch renormalization layer determines the batch renormalization layer output for a training example by transforming the renormalized output for the training example (i.e., as determined in 206) in accordance with current values of a set of learnable parameters of the batch renormalization layer.

When the layer previous to the batch renormalization layer is a layer that generates an output that includes multiple components indexed by a single dimension, the batch renormalization layer transforms, for each dimension, the component of each renormalized output in the dimension in accordance with current values of the set of parameters for the dimension. That is, the batch renormalization layer maintains a respective set of parameters for each dimension and uses those parameters to apply a transformation to the components of the renormalized outputs in the dimension. The values of the sets of parameters are adjusted as part of the training of the neural network system. For example, in some cases, for a component $\hat{y}_{k,i}$ corresponding to the k-th dimension of the i-th renormalized output, the k-th dimension of the i-th batch renormalization layer output $y_{k,i}$ satisfies:

$$y_{k,i} = \gamma_k \hat{y}_{k,i} + \beta_k,$$

where $\gamma_k$ and $\beta_k$ are the learnable parameters for the k-th dimension.

When the layer previous to the batch renormalization layer is a neural network layer that generates an output that includes multiple components that are each indexed by both a feature index and a spatial location index, the batch renormalization layer transforms, for each component of each of the renormalized outputs, the component in accordance with current values of a set of parameters for the feature index corresponding to the component. That is, the batch renormalization layer maintains a respective set of parameters for each feature index and uses those parameters to apply a transformation to the components of the renormalized outputs that have the feature index, e.g., in the same manner as described above when the layer below the batch renormalization layer generates outputs indexed by a single dimension. The values of the sets of parameters are adjusted as part of the training of the neural network system.

In some other implementations, the batch renormalization layer determines the batch renormalization layer output for a training example to be the renormalized output for the training example (i.e., as determined in 206).

The batch renormalization layer updates the values of the moving normalization statistics (210). The batch renormalization layer maintains moving normalization statistics for each component of the previous layer outputs, which are moving averages of the normalization statistics for the component (specifically, the mean and standard deviation normalization statistics as described in 204) over batches of training examples processed over previous training iterations. The batch renormalization layer updates the moving normalization statistics for each component at each training iteration, for example, in accordance with the relationships:

$$\mu \leftarrow \mu + \alpha(\mu_B - \mu),$$

$$\sigma \leftarrow \sigma + \alpha(\sigma_B - \sigma),$$

where $\leftarrow$ indicates the assignment operation, $\sigma_B$ is the standard deviation normalization statistic for the component for the batch, $\sigma$ is the standard deviation moving normalization statistic for the component, $\mu_B$ is the mean normalization statistic for the component for the batch, and $\mu$ is the mean moving normalization statistic for the component.

The batch renormalization layer provides the batch renormalization layer outputs as input to a layer after the batch renormalization layer (i.e., to the layer that is configured to receive the batch renormalization layer outputs) (step 212).

Figure 3:
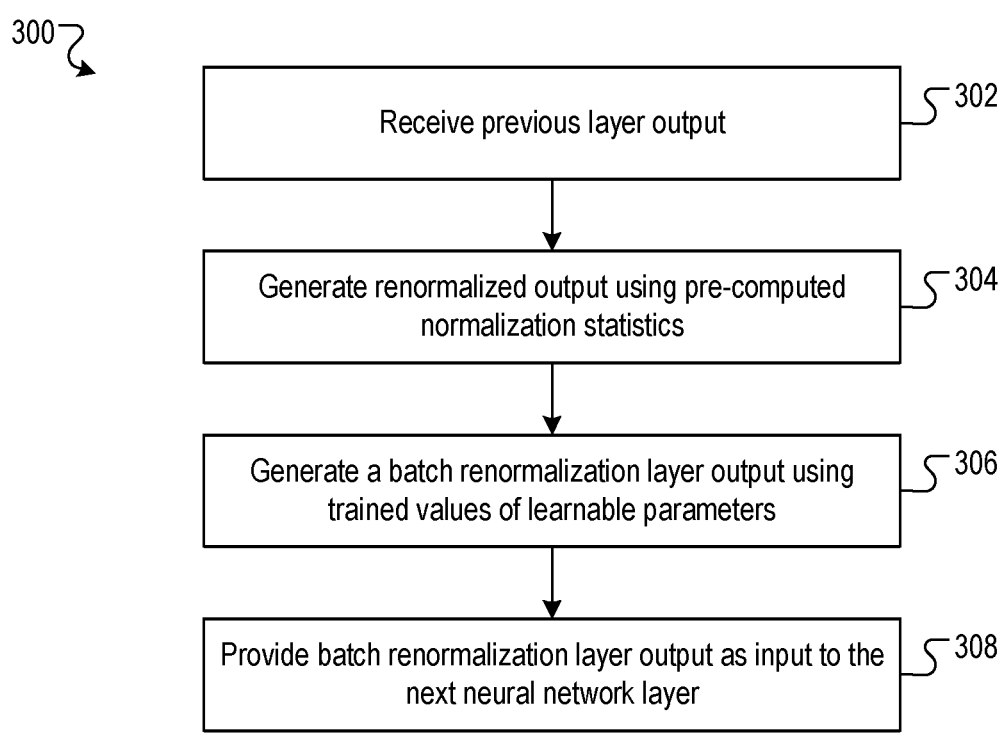
FIG. 3 is a flow diagram of an example process for processing a previous layer output using a batch renormalization layer after the neural network has been trained.

FIG. 3 is a flow diagram of an example process for processing a previous layer output using a batch renormalization layer after the neural network has been trained. For convenience, the process 300 will be described as being performed by a system of one or more computers located in one or more locations. For example, a batch renormalization layer included in a neural network system, e.g., the batch renormalization layer 108 included in the neural network system 100 of FIG. 1, appropriately programmed, can perform the process 300.

The batch renormalization layer receives the previous layer output for the neural network input currently being processed (step 302).

The batch renormalization layer generates a normalized output for the neural network input (step 304). Specifically, the batch renormalization layer adjusts each component of the previous layer output in accordance with pre-computed normalization statistics for the component. In some cases, the pre-computed normalization statistics for a component are given by a pre-computed mean normalization statistic $\mu$ and a pre-computed standard deviation normalization statistic $\sigma$, and the batch renormalization layer generates the component $\hat{x}$ of the normalized output from the corresponding component x of the previous layer output as:

$$\hat{x} = \frac{x - \mu}{\sigma}$$

In some implementations, the pre-computed normalization statistics for a component are given by the values of the moving normalization statistics for the component after the final iteration of neural network training (i.e., described with reference to 210).

In some other implementations, the pre-computed normalization statistics for a component are generated after the neural network is trained based on outputs generated by the previous layer while processing neural network inputs that are not included in the training data used to train the neural network.

In particular, in some cases the distribution of network inputs and, accordingly, the distribution of previous layer outputs may change between the training examples used during training and the new neural network inputs used after the neural network system is trained, e.g., if the new neural network inputs are different kinds of inputs from the training examples. For example, the neural network may have been trained on user images and may now be used to process video frames. The user images and the video frames likely have different distributions in terms of the classes pictured, image properties, composition, and so on. Therefore, normalization statistics based on the training data may not accurately capture the statistics of the previous layer outputs being generated for the new inputs. Thus, in these cases, the batch renormalization layer can use normalization statistics computed from lower layer outputs generated by the layer below the batch renormalization layer after training.

As described with reference to 204, the computation of normalization statistics depends on whether the components of the previous layer output are indexed by a single dimension (e.g., if the previous layer is a fully-connected layer) or jointly indexed by a feature index and a spatial index (e.g., if the previous layer is a convolutional layer).

The batch renormalization layer generates a batch renormalization layer output for the neural network input (306).

In some implementations, the batch renormalization layer determines the batch renormalization layer output for the neural network input by transforming each component of the normalized output for the neural network input in accordance with the trained values of the set of learnable parameters associated with the component (which are described with reference to 208). Optionally, prior to transforming each component of the normalized output in accordance with the trained values of the set of learnable parameters associated with the component, the batch renormalization layer may clip the normalized outputs to lie in a fixed range (as described with reference to 206).

In some other implementations, the batch renormalization layer determines the batch renormalization layer output for the neural network input to be the normalized output for the neural network input.

The batch renormalization layer provides the batch renormalization layer output as input to the layer after the batch renormalization layer (308).

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A system comprising one or more computers and one or more storage devices storing instructions that when executed by one or more computers cause the one or more computers to implement a neural network, the neural network comprising:
 a batch renormalization layer between a first neural network layer and a second neural network layer, wherein the first neural network layer generates first layer outputs having a plurality of components, and wherein the batch renormalization layer is configured to, during training of the neural network on a current batch of training examples:
  obtain respective current moving normalization statistics for each of the plurality of components that are based on previous first layer outputs generated by the first neural network layer during training of the neural network on previous batches of training examples;
  receive a respective first layer output for each training example in the current batch;
  compute respective current batch normalization statistics for each of the plurality of components from the first layer outputs for the training examples in the current batch;
  determine respective affine transform parameters for an affine transform for each of the plurality of components from the current moving normalization statistics and the current batch normalization statistics; and
  for each of the first layer outputs for each of the training examples in the current batch:
   normalize each component of the first layer output using the current batch normalization statistics for the component to generate a normalized layer output for the training example,
   apply the affine transform to each component of the normalized layer output in accordance with the affine transform parameters for the component to generate a renormalized layer output for the training example,
   generate a batch renormalization layer output for the training example from the renormalized layer output, and
   provide the batch renormalization layer output as an input to the second neural network layer.

2. The system of claim 1, wherein the batch renormalization layer is further configured to:
 update the current moving normalization statistics for each component using the current batch normalization statistics for the component to generate updated moving normalization statistics for the component.

3. The system of claim 1, wherein, during the training of the neural network, the system is configured to backpropagate through the current batch normalization statistics as part of adjusting values of parameters of the neural network while treating the moving normalization statistics and the parameters of the affine transform as a constant.

4. The system claim 1, wherein the plurality of components are respective dimensions of the first layer outputs.

5. The system of claim 1, wherein the first neural network layer is a convolutional layer, wherein the first layer outputs comprise a plurality of feature maps, and wherein each component is a respective feature map.

6. The system of claim 1,
 wherein the current moving normalization statistics comprise, for each of the components:
  a moving mean of the component for the previous first layer outputs, and
  a moving approximated standard deviation for the component of the first layer outputs;
 wherein computing a plurality of current batch normalization statistics for the first layer outputs comprises, for each of the components:
  computing a mean of the component for the first layer outputs in the current batch; and
  computing an approximated standard deviation for the component of the first layer outputs in the current batch.

7. The system of claim 6, wherein normalizing each component of each first layer output comprises:
 normalizing the component of the first layer output using the computed mean and computed approximate standard deviation for the component.

8. The system of claim 6, wherein determining respective parameters for an affine transform for each of the components comprises, for each component:
 determining a first parameter for the component from a ratio between (i) a difference between the mean for the component and the moving mean for the component and (ii) the moving approximated standard deviation for the component; and determining a second parameter for the component from a ratio between the approximated standard deviation for the component and the moving approximated standard deviation for the component.

9. The system of claim 8, wherein applying the affine transform to each component of the normalized layer output in accordance with the parameters comprises:

multiplying the component of the normalized layer output by the second parameter for the component to generate a product; and adding the first transform for the component to the product to generate the component of the renormalized layer output.

10. The system of claim 8, wherein values of the first parameter and the second parameter are constrained to fall in a pre-determined range.

11. The system of claim 6, wherein an approximate standard deviation for a component is a square root of a sum of a variance for the component and a pre-determined constant value.

12. The system of claim 1, wherein generating the respective batch renormalization layer output for the training example from the renormalized layer outputs comprises:

transforming, for each component, the component of the renormalized layer output for the training example in accordance with current values of a set of learnable parameters for the component.

13. The system of claim 12, wherein the batch renormalization layer is configured to, after the neural network has been trained to determine trained values of the learnable parameters for each of the components:

receive a new first layer output generated by the first neural network layer for a new neural network input;

normalize each component of the new first layer output using respective pre-computed normalization statistics for the component to generate a new renormalized layer output;

generate a new batch renormalization layer output by transforming, for each component, the component of the new renormalized layer output in accordance with the trained values of the set of learnable parameters for the component; and provide the batch renormalization layer output as a new layer input to the second neural network layer.

14. The system of claim 13, wherein the pre-computed normalization statistics for the components are final moving normalization statistics after training of the neural network.

15. The system of claim 13, wherein the pre-computed normalization statistics for the components are computed from new first layer outputs generated by the first neural network layer after the neural network has been trained.

16. The system of claim 1, wherein the affine transform parameters include a scale parameter and a bias parameter, and wherein determining respective affine transform parameters comprises:

determining the scale parameter value to be one and the bias parameter value to be zero if a number of completed training iterations is less than a predetermined threshold number of training iterations.

17. The system of claim 1, wherein generating a renormalized layer output for the training example further comprises:

clipping each component of the renormalized layer output to cause the component to lie in a predetermined range.

18. The system of claim 15, wherein new neural network inputs processed by the neural network after the neural network has been trained are a different type of input than the training examples used to train the neural network.

19. The system of claim 1, wherein the first neural network layer generates the first layer outputs by modifying first layer inputs in accordance with current values of a set of parameters for the first neural network layer.

20. The system of claim 19, wherein the second neural network layer generates second layer outputs by applying a non-linear activation function to the batch renormalization layer outputs.

21. The system of claim 1, wherein the first neural network layer generates the first layer outputs by modifying first layer inputs in accordance with current values of a set of parameters to generate modified first layer inputs and then applying a non-linear activation function to the modified first layer inputs.

22. The system of claim 1, wherein the neural network is a feedforward neural network.

23. The system of claim 1, wherein the neural network is a recurrent neural network.

24. A system comprising one or more computers and one or more storage devices storing instructions that when executed by one or more computers cause the one or more computers to implement:

a neural network, wherein the neural network is configured to receive neural network inputs and to process the neural network inputs to generate a respective neural network output for each of the neural network inputs, and wherein the neural network comprises a batch renormalization layer, wherein the batch renormalization layer is between a first neural network layer and a second neural network layer, wherein the first neural network layer generates first layer outputs having a plurality of components, and wherein the batch renormalization layer is configured to, during training of the neural network on a current batch of training examples:

obtain respective current moving normalization statistics for each of the plurality of components that are based on previous first layer outputs generated by the first neural network layer during training of the neural network on previous batches of training examples;

receive a respective first layer output for each training example in the current batch;

compute respective current batch normalization statistics for each of the plurality of components from the first layer outputs for the training examples in the current batch;

determine respective affine transform parameters for an affine transform for each of the plurality of components from the current moving normalization statistics and the current batch normalization statistics; and for each of the first layer outputs for each of the training examples in the current batch:

normalize each component of the first layer output using the current batch normalization statistics for the component to generate a normalized layer output for the training example, apply the affine transform to each component of the normalized layer output in accordance with the affine transform parameters for the component to generate a renormalized layer output for the training example, generate a batch renormalization layer output for the training example from the renormalized layer output, and provide the batch renormalization layer output as an input to the second neural network layer.

25. A method performed by one or more data processing apparatus, the method comprising:

training a neural network on a current batch of training examples, wherein the neural network comprises a batch renormalization layer between a first neural network layer and a second neural network layer, wherein the first neural network layer generates first layer outputs having a plurality of components, and wherein the batch renormalization layer is configured to, during training of the neural network on the current batch of training examples:

obtain respective current moving normalization statistics for each of the plurality of components that are based on previous first layer outputs generated by the first neural network layer during training of the neural network on previous batches of training examples;

receive a respective first layer output for each training example in the current batch;

compute respective current batch normalization statistics for each of the plurality of components from the first layer outputs for the training examples in the current batch;

determine respective affine transform parameters for an affine transform for each of the plurality of components from the current moving normalization statistics and the current batch normalization statistics; and for each of the first layer outputs for each of the training examples in the current batch:

normalize each component of the first layer output using the current batch normalization statistics for the component to generate a normalized layer output for the training example, apply the affine transform to each component of the normalized layer output in accordance with the affine transform parameters for the component to generate a renormalized layer output for the training example, generate a batch renormalization layer output for the training example from the renormalized layer output, and provide the batch renormalization layer output as an input to the second neural network layer.

26. One or more non-transitory computer-storage media storing instructions that when executed by one or more computers cause the one or more computers to perform operations comprising:

training a neural network on a current batch of training examples, wherein the neural network comprises a batch renormalization layer between a first neural network layer and a second neural network layer, wherein the first neural network layer generates first layer outputs having a plurality of components, and wherein the batch renormalization layer is configured to, during training of the neural network on the current batch of training examples:

obtain respective current moving normalization statistics for each of the plurality of components that are based on previous first layer outputs generated by the first neural network layer during training of the neural network on previous batches of training examples;

receive a respective first layer output for each training example in the current batch;

compute respective current batch normalization statistics for each of the plurality of components from the first layer outputs for the training examples in the current batch;

determine respective affine transform parameters for an affine transform for each of the plurality of components from the current moving normalization statistics and the current batch normalization statistics; and for each of the first layer outputs for each of the training examples in the current batch:

normalize each component of the first layer output using the current batch normalization statistics for the component to generate a normalized layer output for the training example, apply the affine transform to each component of the normalized layer output in accordance with the affine transform parameters for the component to generate a renormalized layer output for the training example, generate a batch renormalization layer output for the training example from the renormalized layer output, and provide the batch renormalization layer output as an input to the second neural network layer.

* * * * *